United States Patent
Henderson et al.

(10) Patent No.: US 11,192,524 B2
(45) Date of Patent: Dec. 7, 2021

(54) SECURE PROXIMITY KEY (71) Applicant: International Business Machines Corporation, Armonk, NY (US)

(72) Inventors: Charles Henderson, Austin, TX (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/734,351

(22) Filed: Jan. 5, 2020

(65) Prior Publication Data

US 2021/0206350 A1 Jul. 8, 2021

(51) Int. Cl.
| | |
|---|---|
| B60R 25/33 | (2013.01) |
| H04W 12/06 | (2021.01) |
| G01S 19/16 | (2010.01) |
| G07C 9/00 | (2020.01) |

(52) U.S. Cl.
CPC .............. B60R 25/33 (2013.01); G01S 19/16 (2013.01); G07C 9/00309 (2013.01); H04W 12/06 (2013.01); B60R 2325/207 (2013.01); G07C 2009/00547 (2013.01); G07C 2209/63 (2013.01)

(58) Field of Classification Search
None
See application file for complete search history.

(56) References Cited

U.S. PATENT DOCUMENTS

| | | | |
|---|---|---|---|
| 6,791,477 B2 | 9/2004 | Sari et al. | |
| 8,638,202 B2 | 1/2014 | Oesterling | |
| 2006/0208066 A1 | 9/2006 | Finn | |
| 2016/0272154 A1* | 9/2016 | Sanji | G07C 9/00 |
| 2018/0232971 A1 | 8/2018 | Schieke | |
| 2018/0354363 A1 | 12/2018 | Rolfes | |
| 2020/0304943 A1* | 9/2020 | Sakurai | B60Q 1/50 |

OTHER PUBLICATIONS

"Remote keyless system," Wikipedia, Mar. 2019, 5 pages.
Brain, "How Remote Entry Works," HowStuffWorks.com, Aug. 2001, 8 pages.
"GPS Accuracy," GPS.gov, U.S. Air Force, National Coordination Office for Space-Based Positioning, Navigation, and Timing, Dec. 2017, 3 pages.
Francillon et al., "Relay Attacks on Passive Keyless Entry and Smart Systems in Modern Cars," Proceedings of the Network and Distributed System Security Symposium, NDSS 2011, San Diego, California, USA, Feb. 6-Feb. 9, 2011, 15 pages.
Tarun et al., "Next Generation Auto Theft Prevention of a Vehicle," International Journal of Engineering Research and Sports Science, 2014, 3 pages.
Wilde, "Ford Introduces Theft-Proof Keyless Fobs in Europe," Apr. 2019, 3 pages.

* cited by examiner

Primary Examiner — Carlos Garcia
(74) Attorney, Agent, or Firm — VanLeeuwen & VanLeeuwen; Jeffrey S. LaBaw

(57) ABSTRACT

An approach is disclosed that receives a wireless request from a proximity key that is used to access a vehicle. The wireless request includes a key-GPS that is a set of Global Positioning Satellite (GPS) coordinates that correspond to the proximity key. A vehicle-GPS is retrieved at the vehicle with the vehicle-GPS being a set of GPS coordinates that correspond to the vehicle. A distance between the proximity key and the vehicle based is calculated on a difference between the key-GPS and the vehicle-GPS. The approach then determines whether to perform the request based on the calculated distance.

20 Claims, 5 Drawing Sheets

SECURE PROXIMITY KEY

BACKGROUND

A proximity key is a small key fob that allows keyless entry to a vehicle and also allows the user to start the vehicle's ignition. The key fob wirelessly communicates with the vehicle, usually using radio waves, to lock and unlock doors and to start the engine. Generally, the key fob needs to be within an acceptable distance range to operate. Proximity keys are known by a variety of names. Some of the more common names include Intelligent Key, Keyless Access, Keyless Entry, Keyless Go, Push Button Start, Push-to-Start, and Smart Key.

The proximity key allows the user to keep the proximity key in a pocket or purse when unlocking, locking and starting the vehicle. Traditionally, the proximity key is identified via one of several antennae in the car's bodywork and a radio pulse generator in the key housing. The proximity key is an extension of Remote Keyless Entry (RKE) in which the user presses a button to unlock doors or perform other actions on the vehicle. Traditionally, RKE is secured using a 40-bit rotating code generated by a pseudo-random number generator. Proximity keys essentially extend RKE technology by associating a specific key fob with a certain vehicle. Some proximity keys use the same rotating code technology used in RKE to protect the proximity key. While transmitted data is usually encrypted to prevent "snooping," traditional proximity keys can expose vehicles to theft.

One way that proximity keys expose vehicles to theft is by using signal relaying where two transmitters are used—one somewhat near the actual proximity key and the other near or inside the vehicle. Proximity keys use a relatively simple process briefly described above where the proximity key emits a radio signal that is intended to carry a short distance, such as thirty feet or so. In signal relaying, thieves use wireless transmitters that are held up to the front door, window, or just outside of the building with the real proximity being inside the building so that the transmitter can capture the signal from the real proximity key and relay it to the vehicle where another transmitter captures the signal deceiving the vehicle into unlocking the vehicle doors. Once the thief is inside the vehicle, the relay process is repeated with the relayed signal once again deceiving the vehicle into starting the engine, at which point the thief can drive away and steal the vehicle.

SUMMARY

An approach is disclosed that receives a wireless request from a proximity key that is used to access a vehicle. The wireless request includes a key-GPS that is a set of Global Positioning Satellite (GPS) coordinates that correspond to the proximity key. A vehicle-GPS is retrieved at the vehicle with the vehicle-GPS being a set of GPS coordinates that correspond to the vehicle. A distance between the proximity key and the vehicle based is calculated on a difference between the key-GPS and the vehicle-GPS. The approach then determines whether to perform the request based on the calculated distance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

FIGS. 1-5 show an approach that forms a two factor authentication based on "what you have," in this case a secure key fob, and "where you are," in this case how proximate the user is to a vehicle that is tied to the secure key fob. The approach uses a secure key fob that has a built-in Global Positioning System (GPS) receiver that provides current GPS coordinates of the secure key and communicates with a vehicle system that also has access to a GPS receiver that provides the current coordinates of the vehicle. The approach transmits the GPS coordinates of the secure key fob along with the traditional rotating key code. In one embodiment, the GPS coordinates of the secure key fob (the key-GPS) are encrypted (digitally signed) using a rotating key known to both the secure key fob and the vehicle. The radio receiver in the car receives the signal and decrypts the packet to retrieve the GPS coordinates of the secure key fob. The approach then compares the secure key fob GPS coordinate position (key-GPS) to the GPS coordinate position of the vehicle (key-vehicle) to decide whether the secure key fob is actually close enough to the vehicle to perform the request. For example, in one embodiment, to start the vehicle, the secure key fob should be inside the vehicle to indicate that the driver of the vehicle is currently inside the vehicle. Here, the key-GPS and vehicle-GPS are compared to ensure that the driver (key-GPS) is indeed inside the vehicle before starting the vehicle's engine.

In one embodiment, the actual distance between the vehicle and the secure key fob is used as a secondary authentication factor with along with the rotating key being the primary authentication factor used to authenticate the driver. In one embodiment, another authentication factor can be provided at the secure key fob, such as user biometric data (e.g., a finger print, etc.) or code entered on a secure key fob keypad (e.g., a PIN code, etc.). In the event where the GPS receiver is not functional (e.g., secure key fob battery died, GPS broken, etc.), the driver can authenticate by using a biometric authentication with the key fob and the vehicle concurrently. For example, if the GPS receiver is not functioning in the secure key fob, instead of the vehicle being disabled, the driver can use a fingerprint on the secure key fob to provide the secondary authentication.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
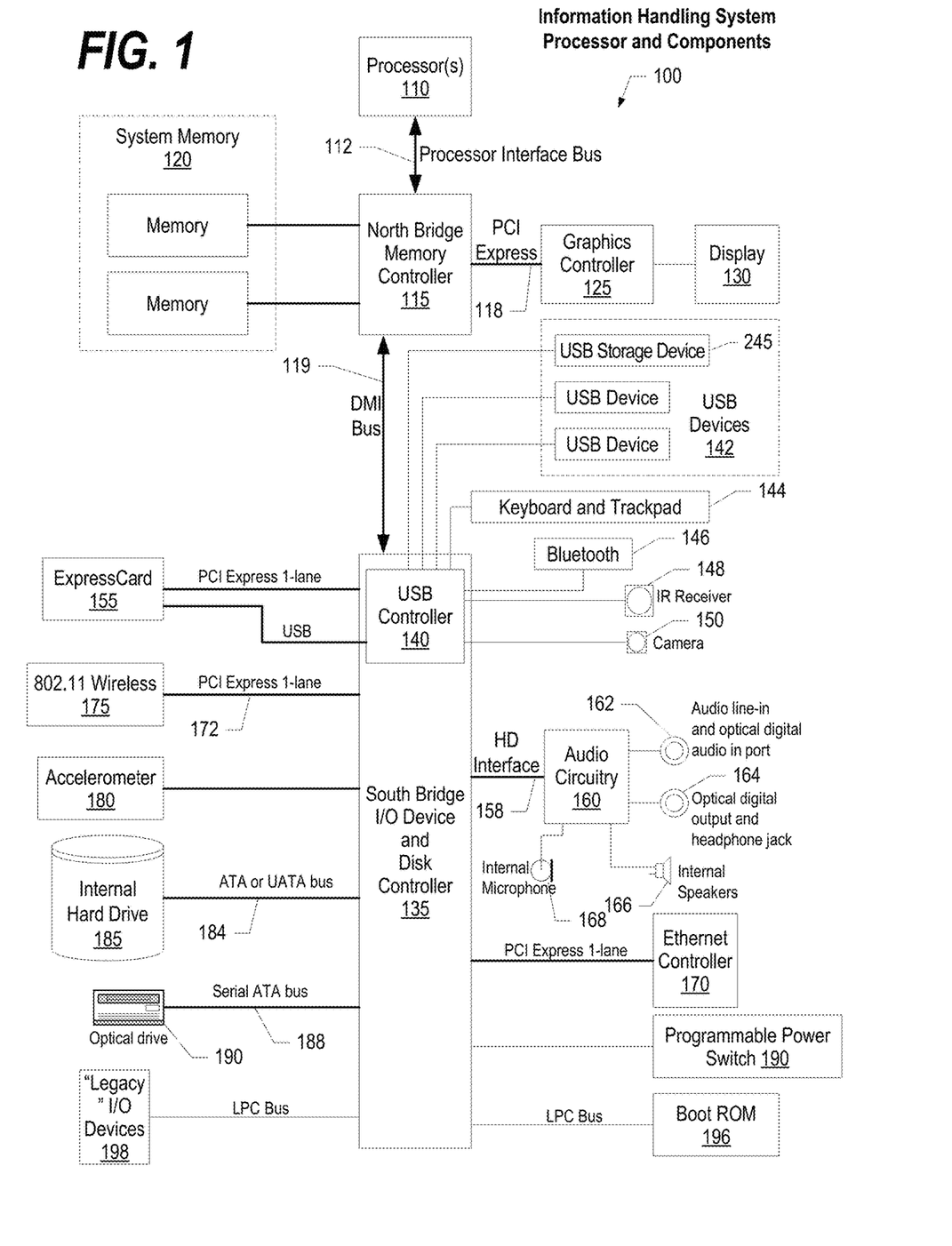
FIG. 1 is a block diagram of a data processing system in which the methods described herein can be implemented.
Figure 2:
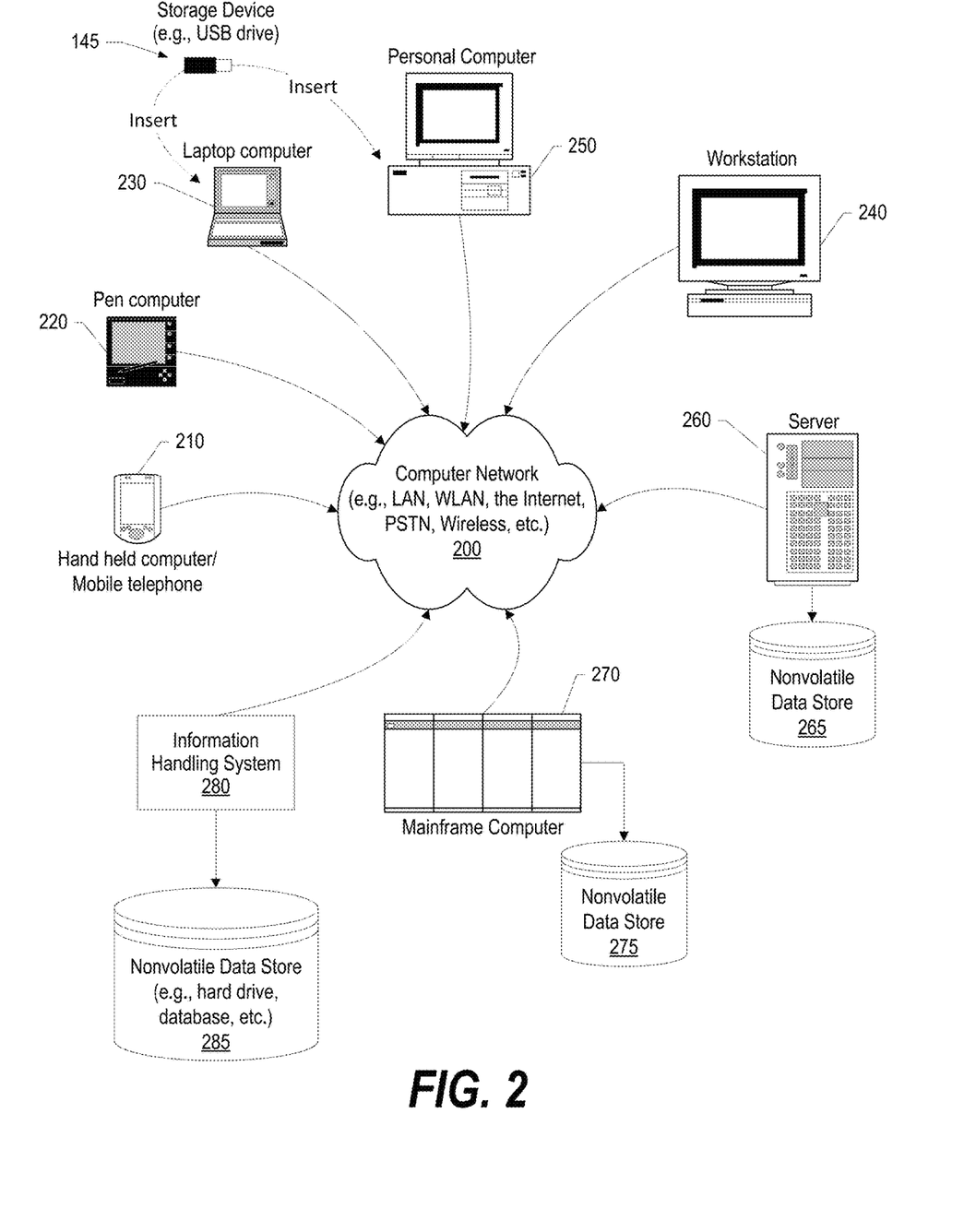
FIG. 2 provides an extension of the information handling system environment shown in FIG. 1 to illustrate that the methods described herein can be performed on a wide variety of information handling systems which operate in a networked environment.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices. FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
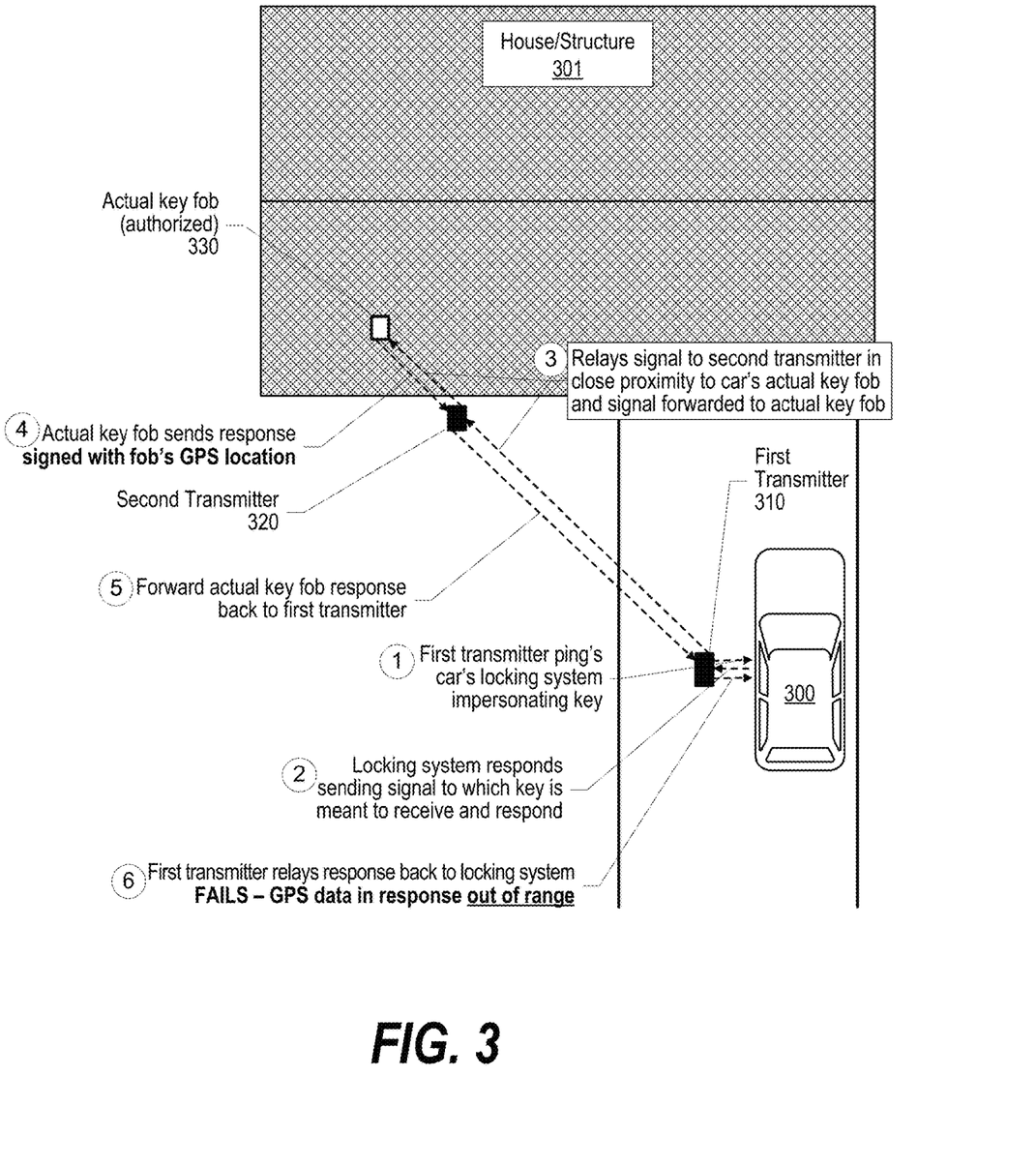
FIG. 3 is a component diagram depicting a vehicle theft being thwarted by a secure proximity key that includes an actual proximity key location.

FIG. 3 is a component diagram depicting a vehicle theft being thwarted by a secure proximity key that includes an actual proximity key location. Vehicle 300 is shown with its actual (authorized) proximity key 330 located inside structure 301, such as a house, building, etc. Thieves are outside house 301 attempting to steal vehicle 300 using relaying transmission of signals with such relaying process often being successful with traditional (non-proximate) vehicle fobs. However, as shown in FIG. 3, proximate security key fob 330 prevents the theft of the vehicle when the thieves attempt to relay signals from the key fob.

At step 1, the thieves' first transmitter 310 pings the vehicle's locking system impersonating the actual key. At step 2, the vehicle's locking system responds by sending a signal that the actual key fob is meant to receive and then respond thereto. At step 3, first transmitter 310 relays the signal from the vehicle's locking system to second transmitter 320 that is located proximate to the vehicles actual (authorized) key fob 330. At step 4, the vehicle's actual key fob 330 receives the signal and sends a response. However, unlike traditional system, the response includes GPS coordinates of the actual key fob (key-GPS). In one embodiment, key-GPS cannot be altered by the thieves as it is encrypted using the rolling code known only to the key fob and the vehicle.

At step 5, the thieves' second transmitter 320 receives the signal from the actual key fob and forwards the response back to first transmitter 310. At step 6, the first transmitter relays the response received from the actual key fob to the vehicle's locking system. The vehicle's locking system decrypts the key-GPS and calculates the actual distance between the proximity key fob and the vehicle using the key-GPS data and the vehicle's GPS data (vehicle-GPS). This reveals that the actual proximity key fob is not currently within the distance required to make the request, in this case the request being to unlock the vehicle, so the request fails and the vehicle remains locked.

In one embodiment, the distance between the proximity key and the vehicle can be used to determine which requests are allowed and which ones are denied. For example, locking the doors might be allowed at a greater distance than unlocking the doors since locking the doors can be seen as securing the vehicle, while unlocking the doors can be seen as making the vehicle less secure as a thief could gain entry and steal items within the vehicle. A request to start the vehicle might require that the distance between the proximity key and the vehicle be extremely small, approaching zero, indicating that the proximity key is inside the vehicle so that someone outside the vehicle cannot start the vehicle. In some vehicles, a "start" button inside the vehicle is pressed with the vehicle checking that the proximity key is somewhere inside the vehicle when the button is pressed.

Figure 4:
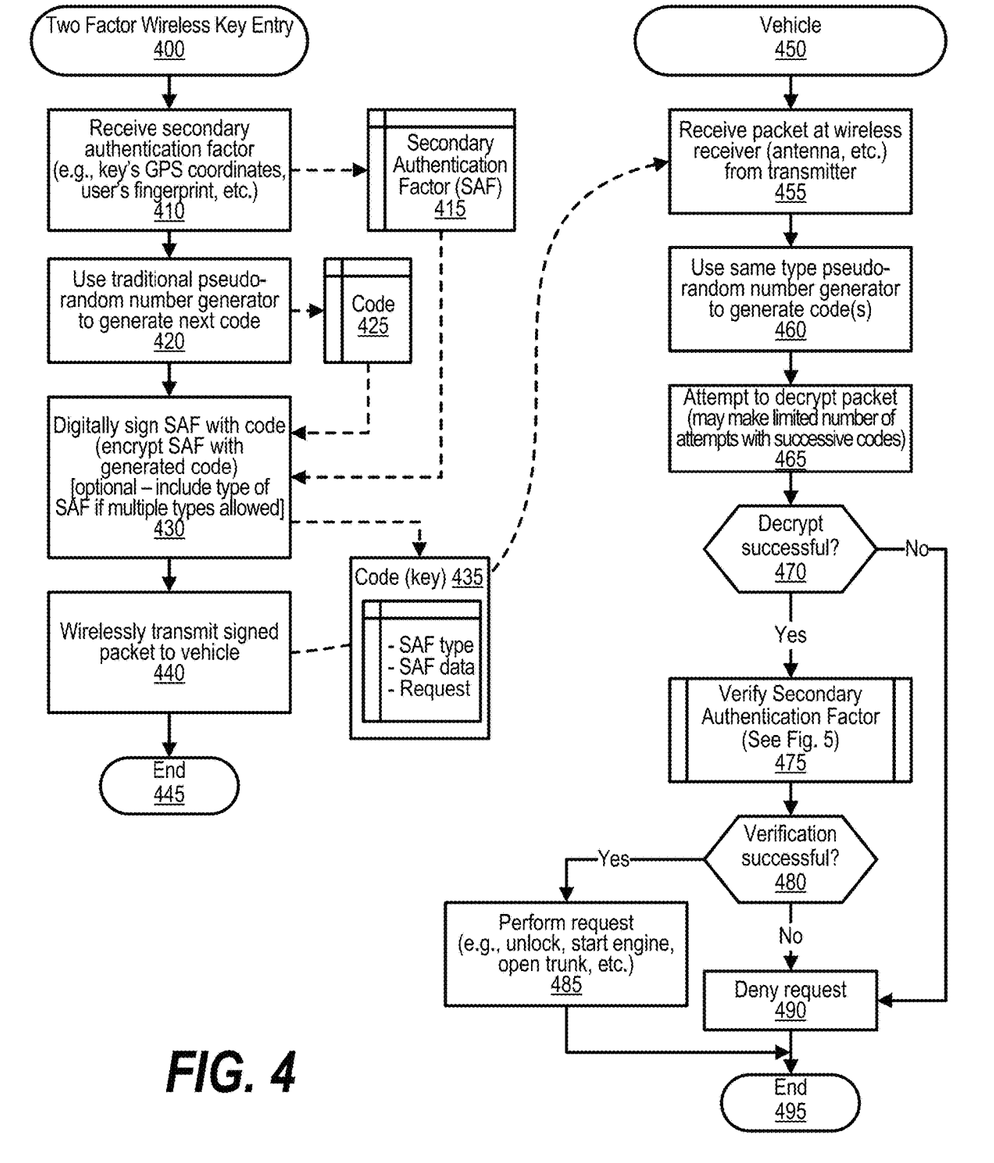
FIG. 4 is a flowchart depicting a two-factory authentication of a request received at a vehicle from a proximity key.

FIG. 4 is a flowchart depicting a two-factory authentication of a request received at a vehicle from a proximity key. FIG. 4 processing performed by the proximity key commences at 400. At step 410, the process performed by the proximity key receives a secondary authentication factor, such as the proximity key's current GPS coordinates (key-GPS), that are used to secondarily authenticate the proximity key in addition the primary authentication factor (e.g., a rolling pseudo-random code, etc.). Other secondary authentication factors can also be used in addition to the GPS coordinates, such as the user's biometric data (e.g., fingerprint, etc.), an access, or PIN, code entered by the user, etc. These other secondary factors may be input if the GPS coordinates become unavailable, such as the proximity key running out of power or the proximity key's GPS unit failing to operate. The secondary authentication factor retrieved at step 410 is stored in memory area 415.

At step 420, the process performed by the proximity key uses a traditional pseudo-random number generator to generate next code. The pseudo-random number generator uses the same algorithm to generate random numbers as the pseudo-random number generator that is used in the vehicle so that the random numbers generated at the proximity key and vehicle are the same. The code that is generated is stored in memory area 425.

At step 430, the proximity key process digitally signs (encrypts) the secondary authentication factor data (e.g., key-GPS data, etc.) using the code that was generated at step 420. In addition, the packet of encrypted data might also include the type of secondary authentication factor (e.g., key-GPS, biometric, PIN code, etc.) if multiple types of secondary authentication factor can be provided by the proximity key. This results in encrypted packet 435 being formed with the contents of the encrypted packet including the secondary authentication factor (e.g., GPS coordinates of the proximity key, etc.), the type of secondary authentication factor being transmitted, and the particular request being made by the user (e.g., unlock doors, start engine, etc.).

At step 440, the process wirelessly transmits the signed (encrypted) packet of data to the vehicle. Processing performed by the proximity key thereafter ends at 445. FIG. 4 processing then shows the steps taken by a process that is performed by a vehicle system that receives and responds to requests from a proximity key commences at 450.

At step 455, the vehicle system's process receives packet 435 at the vehicle's wireless receiver (antenna, etc.) from the proximity key's transmitter. At step 460, the vehicle system's process uses the same pseudo-random number algorithm to generate a code as was generated by the proximity key. At step 465, the vehicle system's process attempts to decrypt the received packet using the generated code. Note that a limited number of attempts (e.g., 255, etc.) is allowed with successive codes from the generator as the code generated may be out of sync, especially if the user is using two different proximity keys with the same vehicle as one of the proximity key's "next" pseudo-random code may be slightly out-of-sync with the vehicles code generator if the other proximity key has been utilized since the last time that this proximity key has been used.

The vehicle system's process determines whether the packet was successfully decrypted (decision 470). If the packet was successfully decrypted, then decision 470 branches to the 'yes' branch to verify the secondary authentication factor using steps 475 through 485. On the other hand, if the packet was not successfully decrypted, then decision 470 branches to the 'no' branch whereupon, at step 490, the request received from the proximity key is denied, and processing ends at 495.

If the packet was successfully decrypted, then steps 475 through 485 are performed. At predefined process 475, the vehicle system's process performs the Verify Secondary Authentication Factor routine (see FIG. 5 and corresponding text for processing details). Based on the results of the Verify Secondary Authentication Factor routine, the vehicle system's process determines whether verification of the secondary authentication factor was successful (decision 480). If verification of the secondary authentication factor was successful, then decision 480 branches to the 'yes' branch whereupon, at step 485, the vehicle system's process performs the request received from the proximity key, such as unlock vehicle, start engine, open trunk, etc. On the other hand, if verification of the secondary authentication factor was unsuccessful, then decision 480 branches to the 'no' branch whereupon, at step 490, the request from the proximity key is denied. Processing performed by the vehicle system that receives and responds to proximity key initiated requests ends at FIG. 4.

Figure 5:
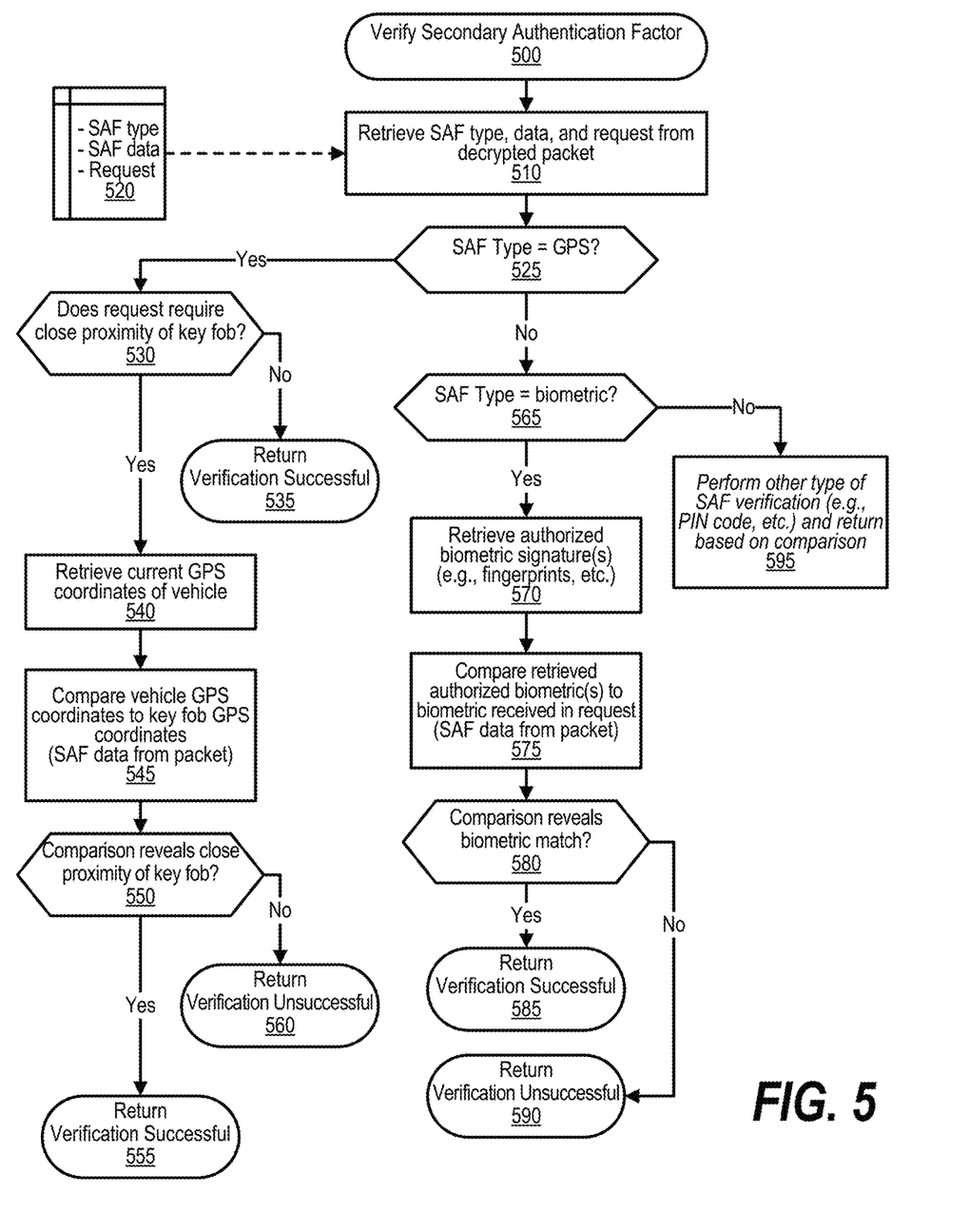
FIG. 5 is a flowchart depicting verification of a secondary authentication factor from a proximity key that includes determination of the proximity key's geographic location.

FIG. 5 is a flowchart depicting verification of a secondary authentication factor from a proximity key that includes determination of the proximity key's geographic location. FIG. 5 processing commences at 500 and shows the steps taken by a process that verifies secondary authentication factors received from a proximity key. At step 510, the process retrieves data from the decrypted packet included the type of secondary authentication factor included in the packet, the secondary authentication factor data itself (e.g., GPS coordinates of the proximity key, etc.), and the actual request (e.g., unlock doors, start engine, etc.).

The process determines as to whether the type of secondary authentication factor data being transmitted are the GPS coordinates of the proximity key (decision 525). If the type of secondary authentication factor data being transmitted is the GPS coordinates of the proximity key, then decision 525 branches to the 'yes' branch whereupon steps 530 through 555 are performed. On the other hand, if the type of secondary authentication factor data being transmitted is not the GPS coordinates of the proximity key, then decision 525 branches to the 'no' branch whereupon steps 565 through 595 are performed.

Steps 530 through 555 are performed when the type of secondary authentication factor data that is being processed is the GPS data from the proximity key (the key-GPS data). The process determines whether the request received requires a particular proximity to the vehicle to operate (decision 530). If the request received requires a particular proximity to the vehicle to operate, then decision 530 branches to the 'yes' branch for further processing. On the other hand, if the request received does not require a particular proximity to the vehicle to operate, then decision 530 branches to the 'no' branch whereupon processing returns to the calling routine (see FIG. 4) at 535 with an indication that the verification was successful.

If the request requires proximity of the vehicle to operate then, steps 540 through 560 are performed. At step 540, the process retrieves the current GPS coordinates of vehicle (vehicle-GPS). At step 545, the process compares the vehicle-GPS coordinates to key-GPS coordinates. In one embodiment, a distance between the coordinates indicated by vehicle-GPS and key-GPS are calculated.

The process determines as to whether the comparison performed at step 545 reveals a close enough proximity of the proximity key to perform the request (decision 550). This proximity may be based on the actual request. For example, if the request is to "unlock" the vehicle doors, then a particular maximum distance may be established as a threshold (e.g., thirty feet, etc.), whereas if the request is to start the vehicle's engine, then the distance may have to show that the proximity key is within the vehicle with the distance being very small (e.g., within a few feet, etc.). If the comparison reveals a close enough proximity of the proximity key to the vehicle to perform the request, then decision 550 branches to the 'yes' branch whereupon processing returns to the calling routine (see FIG. 4) at 555 with an indication that the verification was successful. On the other hand, if the comparison does not reveal a close enough proximity of the proximity key to the vehicle to perform the request, then decision 550 branches to the 'no' branch whereupon processing returns to the calling routine (see FIG. 4) at 535 with an indication that the verification was unsuccessful.

Returning to decision 525, if the secondary authentication factor type is not a GPS type, then the process determines whether the secondary authentication factor type is a biometric type (decision 565). If the secondary authentication factor type is a biometric type, then decision 565 branches to the 'yes' branch to perform steps 570 through 590. On the other hand, if the secondary authentication factor type is not a biometric type, then decision 565 branches to the 'no' branch whereupon, at step 595, the process performs some other type of secondary authentication factor verification, such as a PIN code check, etc., and the return is successful or unsuccessful based on such other secondary authentication factor being authenticated.

If the secondary authentication factor type is a biometric type then processing performs steps 570 through 590. At step 570, the process retrieves the authorized biometric signatures, such as fingerprints, from nonvolatile memory included in the vehicle. At step 575, the process compares the retrieved authorized biometric data to the biometric data that was received in the request. The process determines as to whether the comparison reveals a biometric match (decision 580). If the comparison reveals a biometric match, then decision 580 branches to the 'yes' branch whereupon processing returns to the calling routine (see FIG. 4) at 585 with an indication that the verification was successful. On the other hand, if the comparison does not reveals a biometric match, then decision 580 branches to the 'no' branch whereupon processing returns to the calling routine (see FIG. 4) at 590 with an indication that the verification was unsuccessful.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:
1. A method comprising:
   receiving a wireless request from a proximity key used to access a vehicle, wherein the wireless request includes a key-GPS that is a set of Global Positioning Satellite (GPS) coordinates corresponding to the proximity key;

retrieving, at the vehicle, a vehicle-GPS that is a set of GPS coordinates corresponding to the vehicle;
calculating a distance between the proximity key and the vehicle based on a difference between the key-GPS and the vehicle-GPS; and
determining whether to perform the request based on the calculated distance, wherein the determining comprises:
  in response to the wireless request being a request to unlock the vehicle and the calculated distance being less than or equal to a first distance, performing the wireless request;
  in response to the wireless request being a request to unlock the vehicle and the calculated distance being greater than the first distance, denying the wireless request; and
  in response to the wireless request being a request to lock the vehicle and the calculated distance being greater than the first distance, performing the wireless request.

2. The method of claim 1 further comprising:
decrypting the key-GPS using a code known to the proximity key and the vehicle.

3. The method of claim 1 further comprising:
generating a first code using a first pseudo-random number generator that has been synced with a second pseudo-random number generator utilized at the proximity key; and
using the first code to decrypt the key-GPS, wherein the key-GPS was previously encrypted using a second code that was generated by the second pseudo-random number generator.

4. The method of claim 1 further comprising:
generating a first code using a first pseudo-random number generator that has been synced with a second pseudo-random number generator utilized at the proximity key;
receiving a second code from the proximity key;
first authenticating the request by comparing the first code to the second code; and
second authenticating the request based on the calculated distance.

5. The method of claim 1 further comprising:
receiving an authentication data from the proximity key, wherein the authentication data is selected from the group consisting of a biometric data and a code; and
further authenticating the request based on the authentication data.

6. The method of claim 1 wherein the request is a start vehicle request, wherein the method further comprises:
starting the vehicle in response to identifying that the key-GPS is within an interior of the vehicle based on the vehicle-GPS.

7. The method of claim 6 further comprising:
inhibiting the starting of the vehicle in response to identifying that the key-GPS is outside the interior of the vehicle.

8. An information handling system comprising:
one or more processors;
a Global Positioning System (GPS) receiver;
a wireless receiver;
a memory coupled to at least one of the processors; and
a set of instructions stored in the memory and executed by at least one of the processors to perform actions comprising:
  receiving a wireless request at the wireless receiver from a proximity key used to access a vehicle, wherein the wireless request includes a key-GPS that is a set of GPS coordinates corresponding to the proximity key;
  retrieving, at the GPS receiver, a vehicle-GPS that is a set of GPS coordinates corresponding to the vehicle;
  calculating a distance between the proximity key and the vehicle based on a difference between the key-GPS and the vehicle-GPS; and
  determining whether to perform the request based on the calculated distance, wherein the determining comprises:
    in response to the wireless request being a request to unlock the vehicle and the calculated distance being less than or equal to a first distance, performing the wireless request;
    in response to the wireless request being a request to unlock the vehicle and the calculated distance being greater than the first distance, denying the wireless request; and
    in response to the wireless request being a request to lock the vehicle and the calculated distance being greater than the first distance, performing the wireless request.

9. The information handling system of claim 8 wherein the actions further comprise:
decrypting the key-GPS using a code known to the proximity key and the vehicle.

10. The information handling system of claim 8 wherein the actions further comprise:
generating a first code using a first pseudo-random number generator that has been synced with a second pseudo-random number generator utilized at the proximity key; and
using the first code to decrypt the key-GPS, wherein the key-GPS was previously encrypted using a second code that was generated by the second pseudo-random number generator.

11. The information handling system of claim 8 wherein the actions further comprise:
generating a first code using a first pseudo-random number generator that has been synced with a second pseudo-random number generator utilized at the proximity key;
receiving a second code from the proximity key;
first authenticating the request by comparing the first code to the second code; and
second authenticating the request based on the calculated distance.

12. The information handling system of claim 8 wherein the actions further comprise:
receiving an authentication data from the proximity key, wherein the authentication data is selected from the group consisting of a biometric data and a code; and
further authenticating the request based on the authentication data.

13. The information handling system of claim 8 wherein the request is a start vehicle request, wherein the actions further comprise:
starting the vehicle in response to identifying that the key-GPS is within an interior of the vehicle based on the vehicle-GPS.

14. The information handling system of claim 13 wherein the actions further comprise:
inhibiting the starting of the vehicle in response to identifying that the key-GPS is outside the interior of the vehicle.

15. A computer program product comprising:
a computer readable storage medium comprising a set of computer instructions, the computer instructions effective to perform actions comprising:
- receiving a wireless request from a proximity key used to access a vehicle, wherein the wireless request includes a key-GPS that is a set of Global Positioning Satellite (GPS) coordinates corresponding to the proximity key;
- retrieving, at the vehicle, a vehicle-GPS that is a set of GPS coordinates corresponding to the vehicle;
- calculating a distance between the proximity key and the vehicle based on a difference between the key-GPS and the vehicle-GPS; and
- determining whether to perform the request based on the calculated distance, wherein the determining comprises:
  - in response to the wireless request being a request to unlock the vehicle and the calculated distance being less than or equal to a first distance, performing the wireless request;
  - in response to the wireless request being a request to unlock the vehicle and the calculated distance being greater than the first distance, denying the wireless request; and
  - in response to the wireless request being a request to lock the vehicle and the calculated distance being greater than the first distance, performing the wireless request.

16. The computer program product of claim 15 wherein the actions further comprise:
decrypting the key-GPS using a code known to the proximity key and the vehicle.

17. The computer program product of claim 15 wherein the actions further comprise:
- generating a first code using a first pseudo-random number generator that has been synced with a second pseudo-random number generator utilized at the proximity key; and
- using the first code to decrypt the key-GPS, wherein the key-GPS was previously encrypted using a second code that was generated by the second pseudo-random number generator.

18. The computer program product of claim 15 wherein the actions further comprise:
- generating a first code using a first pseudo-random number generator that has been synced with a second pseudo-random number generator utilized at the proximity key;
- receiving a second code from the proximity key;
- first authenticating the request by comparing the first code to the second code; and
- second authenticating the request based on the calculated distance.

19. The computer program product of claim 15 wherein the request is a start vehicle request, wherein the actions further comprise:
starting the vehicle in response to identifying that the key-GPS is within an interior of the vehicle based on the vehicle-GPS.

20. The computer program product of claim 19 wherein the actions further comprise:
inhibiting the starting of the vehicle in response to identifying that the key-GPS is outside the interior of the vehicle.

* * * * *